United States Patent
Park

(10) Patent No.: US 10,264,410 B2
(45) Date of Patent: Apr. 16, 2019

(54) WEARABLE WIRELESS COMMUNICATION DEVICE AND COMMUNICATION GROUP SETTING METHOD USING THE SAME

(71) Applicant: Sang-Rae Park, Seoul (KR)

(72) Inventor: Sang-Rae Park, Seoul (KR)

( * ) Notice: Subject to any disclaimer, the term of this patent is extended or adjusted under 35 U.S.C. 154(b) by 48 days.

(21) Appl. No.: 15/402,932

(22) Filed: Jan. 10, 2017

(65) Prior Publication Data

US 2018/0199166 A1 Jul. 12, 2018

(51) Int. Cl.
*H04W 4/08* (2009.01)
*H04B 1/3827* (2015.01)

(52) U.S. Cl.
CPC .............. *H04W 4/08* (2013.01); *H04B 1/385* (2013.01)

(58) Field of Classification Search
None
See application file for complete search history.

(56) References Cited

U.S. PATENT DOCUMENTS

| | | | |
|---|---|---|---|
| 5,721,584 A * | 2/1998 | Yoshinobu | H04H 20/31 348/E7.024 |
| 6,012,029 A * | 1/2000 | Cirino | G08B 21/24 704/272 |
| 7,756,255 B1 | 7/2010 | Santharam et al. | |
| 7,983,199 B1 * | 7/2011 | Nguyen | H04L 65/4038 370/260 |
| 2011/0026504 A1 * | 2/2011 | Feinberg | H04W 4/08 370/338 |
| 2014/0188348 A1 * | 7/2014 | Gautama | B60W 10/30 701/48 |
| 2015/0340027 A1 * | 11/2015 | Wang | G10L 15/07 704/221 |
| 2016/0164726 A1 * | 6/2016 | Fraser | H04W 76/14 370/254 |
| 2016/0328983 A1 * | 11/2016 | Hutchinson | G08G 5/045 |
| 2017/0134912 A1 * | 5/2017 | Jurzak | H04W 4/08 |
| 2017/0353979 A1 * | 12/2017 | Lee | H04W 76/10 |

FOREIGN PATENT DOCUMENTS

KR 10-1550648 B1 9/2015

* cited by examiner

*Primary Examiner* — Christine T Duong
(74) *Attorney, Agent, or Firm* — NSIP Law

(57) ABSTRACT

Discussed is a wearable wireless communication device that can set a communication group with other wireless communication devices within a limited range by converting and sending out communication group setting information into a dual tone multi-frequency (DTMF) signal or by transmitting communication group setting information including a certain received signal strength indicator (RSSI) reference value and a communication group setting method using the same.

11 Claims, 19 Drawing Sheets

FIG. 2

| PREAMBLE | START CODE | TRANSMISSION ID | RECEPTION ID | PARING CODE | CONTROL INST | VOICE DATA | COMPLETION CODE |
|---|---|---|---|---|---|---|---|

FIG. 3

| PACKET DELAY | NUMBER OF SLOTS | SLOT RANKING | MASTER | SLAVE | REMOTE TRANSMISSION | RESERVE 1 | RESERVE 2 |
|---|---|---|---|---|---|---|---|

FIG. 15

| DTMF | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | E ( * ) | 0 | F ( # ) | D |

WEARABLE WIRELESS COMMUNICATION DEVICE AND COMMUNICATION GROUP SETTING METHOD USING THE SAME

BACKGROUND

Field of the Invention

The present invention relates to a wearable wireless communication device and a method of setting a communication group using the same, and more particularly to, a wearable wireless communication device capable of performing transmission and reception at the same time using a time-sharing method through, for example, a full duplex function and including an ergonomically designed case configured to be easily worn and having a light weight to make a user feel comfortable during a long time use and a communication group setting method using the same.

Discussion of Related Art

A radio is a machine used for radiotelegraph or radiotelephone. When a radio transceiver is used, it is possible to perform mutual communication while a base station or a relay station is unnecessary and there is no call charge. Using such advantages described above, a radio is used in various fields. For example, in the fields of an industrial field, a factory, the military, climbing and leisure and sport fields in addition to the police, portable radios, daily radios, vehicular radios, and trunked radio system (TRS) radios are used.

A radio regenerates a received sound by converting and outputting a signal received through an antenna through an external speaker and transmits a transmitted sound input through an external microphone to an opponent.

However, currently provided radios use a simplex or half duplex communication method and wearable type radios that have been recently developed much more use the same.

Also, since general radios that are currently provided and wearable type radios that have been recently developed may input voices through operating of general push to talk (PTT) buttons, it is relatively inconvenient to input voices. Also, in case of wearable radios that need confidence according to use, a voice input operation may be visually shown.

Also, since general radios currently provided and wearable type radios recently developed consume a lot of power in a standby process, it is necessary to frequently replace batteries and simultaneously a function failure phenomenon caused by battery depletion occurs a lot of times.

SUMMARY OF THE INVENTION

An aspect of the present invention provides a wearable wireless communication device capable of performing transmission and reception at the same time using a time sharing method through a full duplex function and a wireless communication method of using the same.

Another aspect of the present invention provides a wearable wireless communication device that clearly performs communication among the wearable wireless communication devices in the corresponding communication group without noise and miscommunication as less as possible because it is possible to allow communication to be performed only among wearable wireless communication devices in a communication group set by a division function using a code combination and a wireless communication method using the same.

Another aspect of the present invention provides a wearable wireless communication device capable of automatically sending out a voice signal input to a receiver through a radio frequency (RF) transceiver and an antenna of the wearable wireless communication device even without additional operation of a user for inputting a voice through a push to talk (PTT) button and the like and a wireless communication method using the same.

Another aspect of the present invention provides a wearable wireless communication device that is easily worn due to an ergonomically designed case applied thereto and allows a user to feel comfortable without inconvenience even for a long time use and a wireless communication method using the same.

Another aspect of the present invention provides a wearable wireless communication device that may remotely control transmission of another wearable wireless communication device and may form a master-slave relationship between a plurality of wearable wireless communication devices to more efficiently perform voice communication between the wearable wireless communication devices between which the master-slave relationship is formed as described above and a wireless communication method using the same.

Another aspect of the present invention provides a wearable wireless communication device that may set a communication group with other wireless communication devices within a limited range by converting and sending out communication group setting information into a dual tone multi-frequency (DTMF) signal or by transmitting communication group setting information including a certain received signal strength indicator (RSSI) reference value and a communication group setting method using the same.

According to one aspect of the present invention, there is provided a wearable wireless communication device including a receiver to which an analog voice signal is input, a first amplifier configured to amplify the analog voice signal input through the receiver, an analog/digital (A/D) converter configured to convert the amplified analog voice signal output from the first amplifier into a digital voice signal, a controller configured to receive and output the digital voice signal output from the A/D converter and to output a digital voice signal received through an antenna, an RF transceiver configured to control an input of signals received at the controller through the antenna and transmission of signals output from the controller through the antenna, a digital/analog (D/A) converter configured to convert the digital voice signal output from the controller into an analog voice signal, a second amplifier configured to amplify the analog voice signal output from the D/A converter, and a voice output portion configured to transmit the analog voice signal output from the second amplifier. Here, the controller transmits communication group setting information to other wireless communication devices within a limited range to set a communication group with the other wireless communication devices.

The controller may convert the communication group setting information into a DTMF signal and may send out the DTMF signal through the voice output portion. When the DTMF signal is input through the receiver, the controller may obtain the communication group setting information by decoding the input DTMF signal and.

The DTMF signal may have a frequency component of a 4×4 matrix.

The controller may transmit the communication group setting information including a certain RSSI reference value through the antenna. The controller may extract the RSSI reference value from the received communication group setting information when the communication group setting information is received through the antenna and may check the received communication group setting information when a measured RSSI value is the extracted RSSI reference value or more.

The communication group setting information may include a control instruction (INST) packet, and the RSSI reference value may be included in a Reserve1 or Reserve2 area of the control INST packet.

The communication group setting information may include an ID, a paring code, a master, a slave, and a control INST of a wireless communication device to be included in the communication group.

The controller may amplify a signal received through the antenna and may transmit the signal through the antenna to allow the wearable wireless communication device to operate as a repeater or relay function.

The controller may transmit a signal received from another wireless communication device to a VoIP apparatus and may transmit a signal received form the VoIP apparatus to the other wireless communication device to allow the wearable wireless communication device to operate a donor radio.

According to another aspect of the present invention, there is provided a wireless communication method using a wearable wireless communication device, including transmitting, by a wearable wireless communication device intended to set a communication group, communication group setting information to other wireless communication devices in a limited range to allow the wearable wireless communication device to set the communication group with the other wireless communication devices and setting the communication group by allowing the other wireless communication devices to receive and check the communication group setting information.

The transmitting of the communication group setting information may include converting the communication group setting information into a DTMF signal and sending out the DTMF signal through a speaker. The setting of the communication group may include receiving the DTMF signal through a microphone and obtaining the communication group setting information by decoding the DTMF signal.

The transmitting of the communication group setting information may include transmitting the communication group setting information including a certain RSSI reference value through an antenna. The setting of the communication group may include receiving the communication group setting information through the antenna and extracting the RSSI reference value from the received communication group setting information and checking the received communication group setting information when a measured RSSI value is the extracted RSSI reference value or more.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 2 and 3 are views illustrating a basic packet and a control instruction (INST) packet of the wearable wireless communication device according to one embodiment of the present invention;

FIG. 15 is a view illustrating an example of a dual tone multi-frequency (DTMF) signal used in the communication group setting method of FIG. 14;

DETAILED DESCRIPTION OF EXEMPLARY EMBODIMENTS

Figure 1:
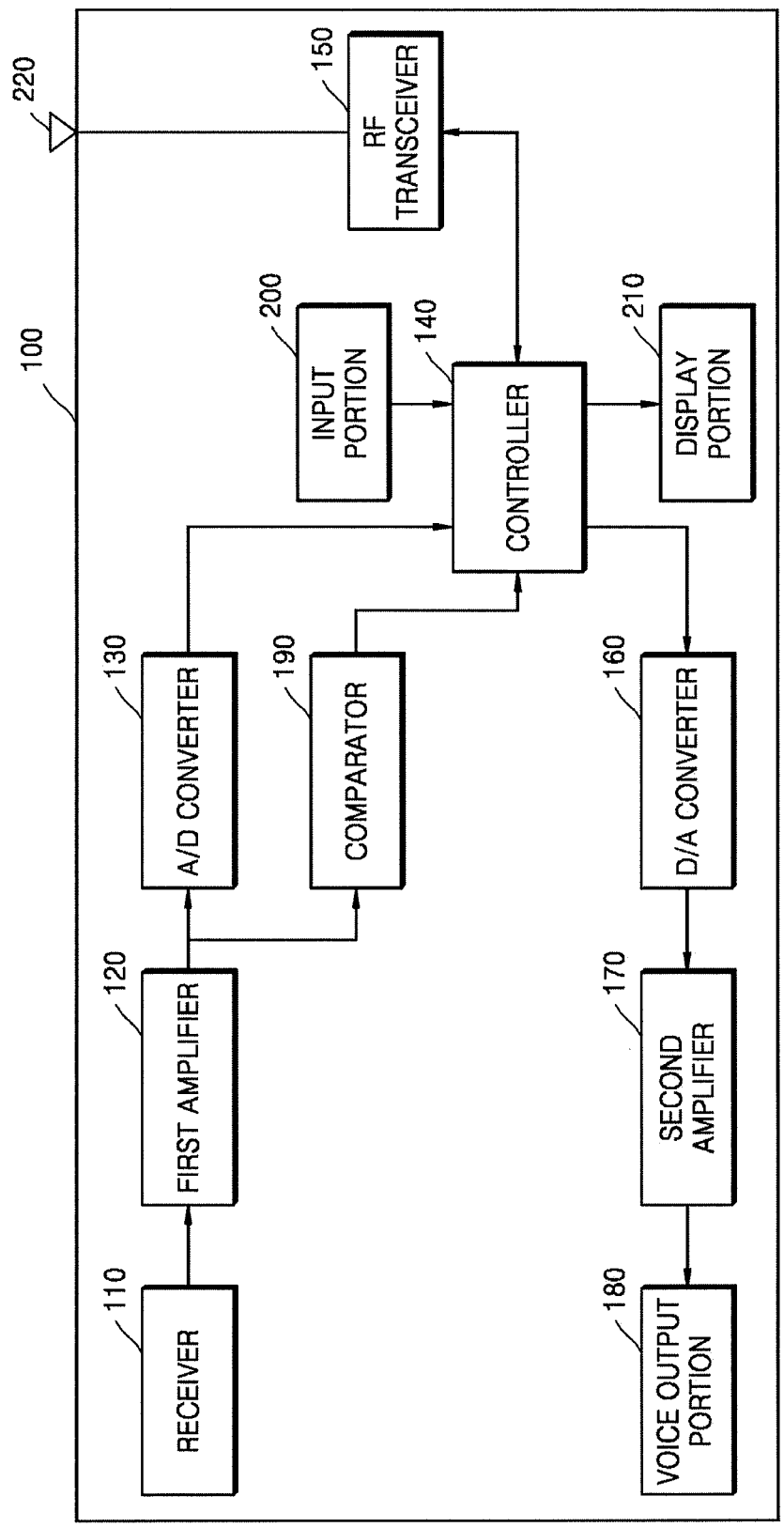
FIG. 1 is a block diagram illustrating a configuration of a wearable wireless communication device according to one embodiment of the present invention.

Hereinafter, exemplary embodiments of the present invention will be described in detail with reference to the drawings. In the following description and attached drawings, substantially like components will be referred to as like reference numerals and a repeated description thereof will be omitted. Also, throughout the description of the embodiments of the present invention, detailed explanations of well-known functions and components of the related art will be omitted when it is deemed that they may unnecessarily obscure the essence of the present invention.

It should be understood that the embodiments of the present invention may be different from one another but are not mutually exclusive. For example, particular shapes, structures, and features disclosed in one embodiment of the present invention may be embodied as other embodiments without departing from the concept and scope of the present invention. Also, it should be understood that positions or arrangements of respective components included in the embodiments of the present invention may be modified without departing from the concept and scope of the present invention.

Accordingly, the following detailed description will not be limitative and the scope of the present invention and the scope of the present invention is limited by only the content defined by the claims and equivalents thereof while an adequate description is given. Throughout the drawings, like reference numerals refer to like or similar functions in various aspects.

Although terms generally used now are selected for the terms used herein considering functions in the present invention, these may vary according to intention of one of ordinary skill in the art, practices, the advent of new technologies and the like. Also, in particular cases, terms randomly selected by (an) applicant(s) are present. In this case, meanings thereof will be described in detail in sections of a description of the present invention corresponding thereto. Accordingly, the terms used herein should be defined, not as simple designations of the terms, based on the meanings of the terms and the content throughout the present invention.

Throughout the specification, when it is described that a portion "includes" an element, unless defined otherwise, it means that the portion does not exclude other elements but may further include other elements. Also, the terms "portion", "module", and the like disclosed herein mean units each configured to perform at least one function or operation and may be embodied as hardware, software, or a combination of hardware and software.

Referring to FIGS. 1 to 18, a wearable wireless communication device and a wireless communication method using the same according to one embodiment of the present invention will be described.

First, referring to FIGS. 1 to 9, the wearable wireless communication device according to one embodiment of the present invention will be described.

FIG. 1 is a block diagram illustrating a configuration of the wearable wireless communication device according to one embodiment of the present invention.

As shown in the drawing, a wearable wireless communication device 100 according to one embodiment of the present invention includes a receiver 110, a first amplifier 120, an analog/digital (A/D) converter 130, a controller 140, a radio frequency (RF) transceiver 150, a digital/analog (D/A) converter 160, a second amplifier 170, a voice output portion 180, and an antenna 220. Also, the wearable wireless communication device 100 may further include a comparator 190, an input portion 200, a display portion 210, and a case (not shown, refer to FIGS. 8 and 9).

The receiver 110 is a portion to which an analog voice signal is input. That is, a user of the wearable wireless communication device 100 inputs a voice through the receiver 110. Also, the receiver 110 may be a general microphone.

The first amplifier 120 amplifies the analog voice signal input through the receiver 110.

The A/D converter 130 converts the amplified analog voice signal output from the first amplifier 120 into a digital voice signal.

The controller 140 receives the digital voice signal output from the A/D converter 130 and outputs the digital voice signal to the RF transceiver 150. Also, the controller 140 outputs a digital voice signal received through the antenna 220 and input through the RF transceiver 150. Here, the digital voice signal received through the antenna 220 corresponds to a digital voice signal transmitted from another wearable wireless communication device or transmitted from another device.

Also, the controller 140 enables full duplex communication with another wireless communication through controlling of a time-sharing function of the antenna 220.

Also, the controller 140 may set a group of other wearable wireless communication devices communicable with a sharing function due to a code combination and may enable communication among wearable wireless communication devices in the set group through this.

The RF transceiver 150 controls the input of signals received at the controller 140 through the antenna 220 and the transmission of signals output from the controller 140.

The D/A converter 160 converts a digital voice signal output from the controller 140 into an analog voice signal.

The second amplifier 170 amplifies the analog voice signal output from the D/A converter 160.

The voice output portion 180 sends out an analog voice signal output from the second amplifier 170. That is, the user of the wearable wireless communication device 100 listens to a voice of a user of another wearable wireless communication device or another device transmitted therefrom through the voice output portion 180. The voice output portion 180 described above may be a general speaker.

The comparator 190 is connected to an output terminal of the first amplifier 120 in parallel with the A/D converter 130 and distinguishes whether voice data is present in an amplified analog voice signal output from the first amplifier 120. Also, the controller 140 is connected in parallel with the A/D converter 130 and the comparator 190 and automatically outputs a digital voice signal input from the A/D converter 130 to the RF transceiver 150 according to a signal input from the comparator 190.

That is, since the wearable wireless communication device 100 determines whether voice data is present in an output signal of the first amplifier 120 through an output signal of the comparator 190 and automatically outputs the corresponding voice data to the RF transceiver 150 to send out through the antenna 220 when the voice data is present, the user of the wearable wireless communication device 100 may automatically send out a voice input to the receiver 110 without operating a push-to-talk (PTT) button and the like.

The input portion 200 performs a signal input function including a PTT signal at the controller 140. The input portion 200 described above may include various buttons including a PTT button.

The display portion 210 is connected to the controller 140 and displays a system setting value and state information of the wearable wireless communication device 100 on a screen. That is, the user of the wearable wireless communication device 100 may perform various settings on the corresponding wearable wireless communication device 100 through the display portion 210 and may visually check a present setting state and an operation state of the wearable wireless communication device 100 that is being used.

Also, the controller 140 may divide a signal output to the RF transceiver 150 into a basic packet and a control instruction (INST) packet to output.

FIGS. 2 and 3 illustrate the basic packet and the control INST packet of the wearable wireless communication device according to one embodiment of the present invention.

As shown in the drawings, the basic packet is a basic digital transmission/reception frame including voice data and the control INST packet is a frame including a control command set necessary in addition to transmitting of voice data transmission and may be transmitted separately from and consecutively to the basic packet whenever a command occurs.

Also, the basic packet may include a preamble, a start code, a transmission ID, a reception ID, a pairing code that functions as a password, a control INST, voice data, and a completion code and the control INST packet may include a packet delay, the number of slots, a slot ranking, a master, a slave, remote transmission, Reserve1, and Reserve2. As an additional description of the pairing code, when paring codes coincide, it is possible to connect a call with another wearable wireless communication device.

Also, the master and the slave of the control INST packet include information on a master for distributing a control command set and a slave for receiving the control command set distributed through the master and also may include information in which the master transfers authority to distribute the control command set to a particular slave. Through this, a master-slave relationship may be formed between two or more wearable wireless communication devices. Also, a master function is transferred to a particular slave wearable wireless communication device through a particular wearable wireless communication device configured to function as a master in such a way that communication between wearable wireless communication devices may be performed based thereon.

Also, remote transmission of the control INST packet may include information on transmission control and exclusive reception with respect to a particular slave of a master. Through this, it is possible to remotely control a signal transmission/reception function of a particular wearable wireless communication device among other wearable wireless communication devices in a communication group at a particular wearable wireless communication device and to perform communication between the wearable wireless communication devices in the corresponding communication group based thereon.

Also, a maximum time slot Tn of the basic packet may be a packet delay T/number n of slots (here, the number n of slots is an integer smaller than <maximum transmission speed/general voice sampling speed (20 kbps)> and is extendable through data compression when necessary).

Also, the number of slots and the slot ranking of the control INST packet may display the number n of slots and the slot ranking N to allow a new communicator to enter the number of slots substituting for a last ranking of N communicator and to communicate when communicators in the communication group exceed the number n of slots (here, the communicator that exceeds the number of slots in the group is also able to always perform reception from all communicators therein).

Figure 4:
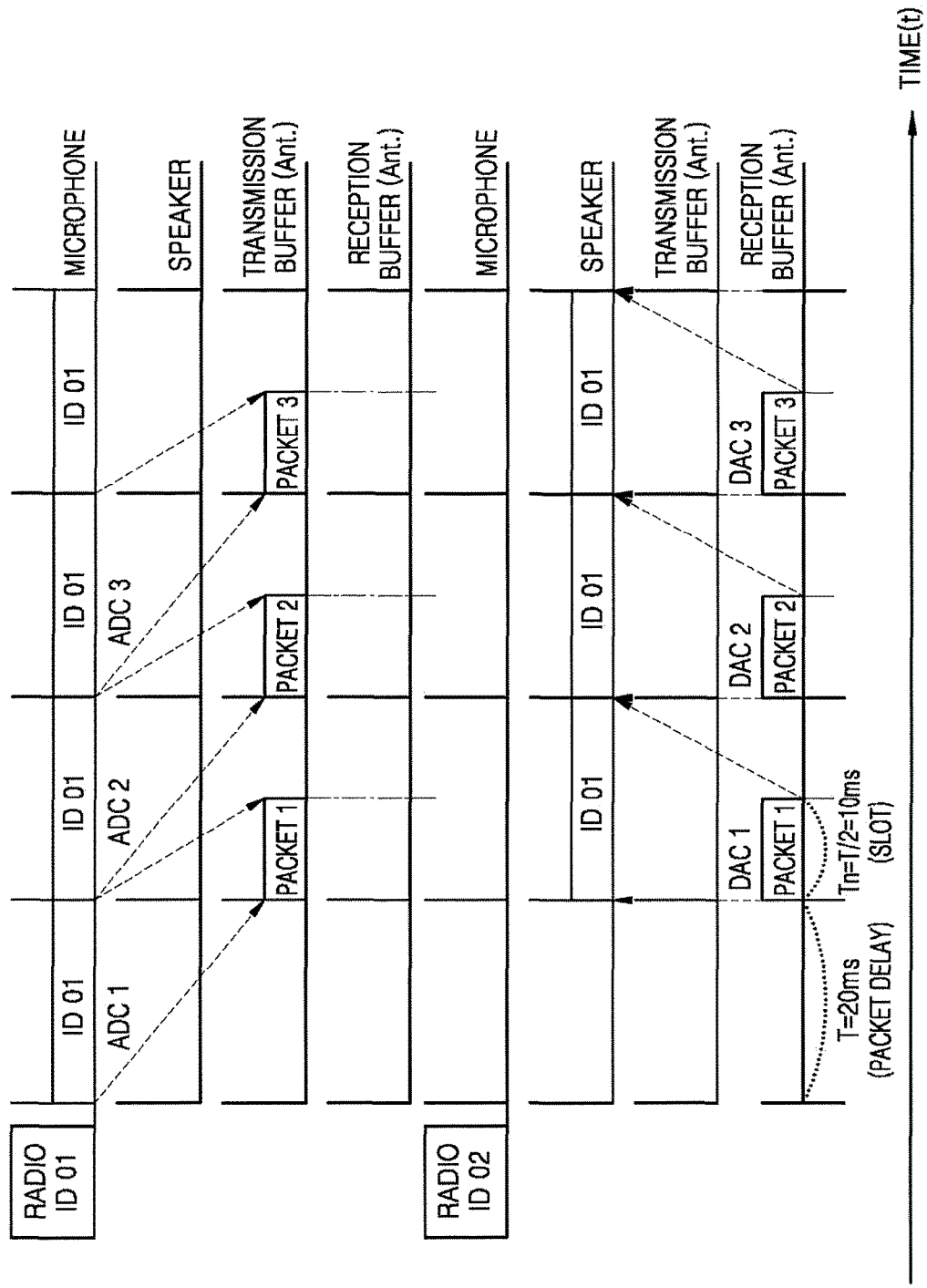
FIGS. 4 to 6 are communication timing diagrams of the wearable wireless communication device according to one embodiment of the present invention.
Figure 5:
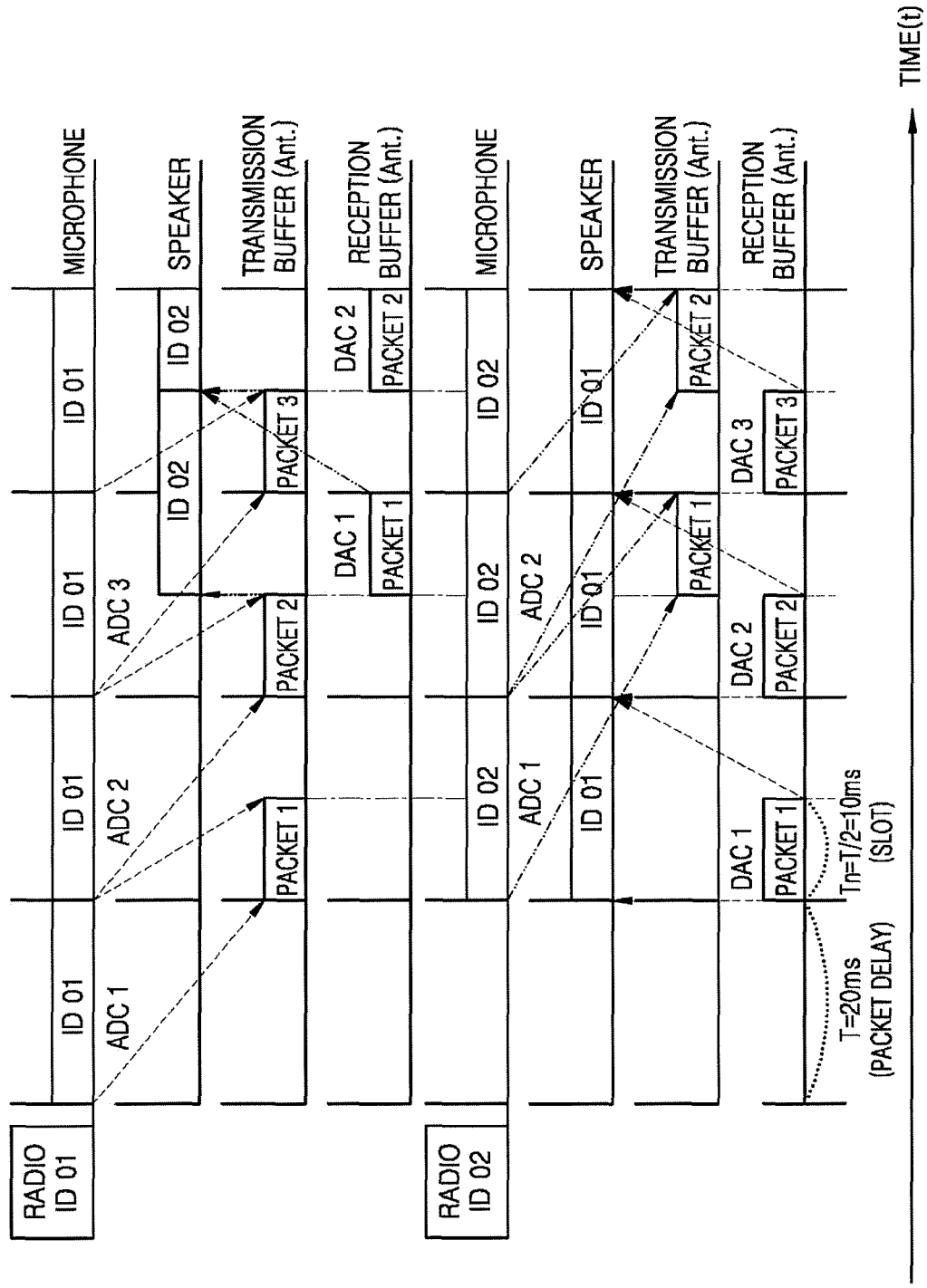
Figure 6:
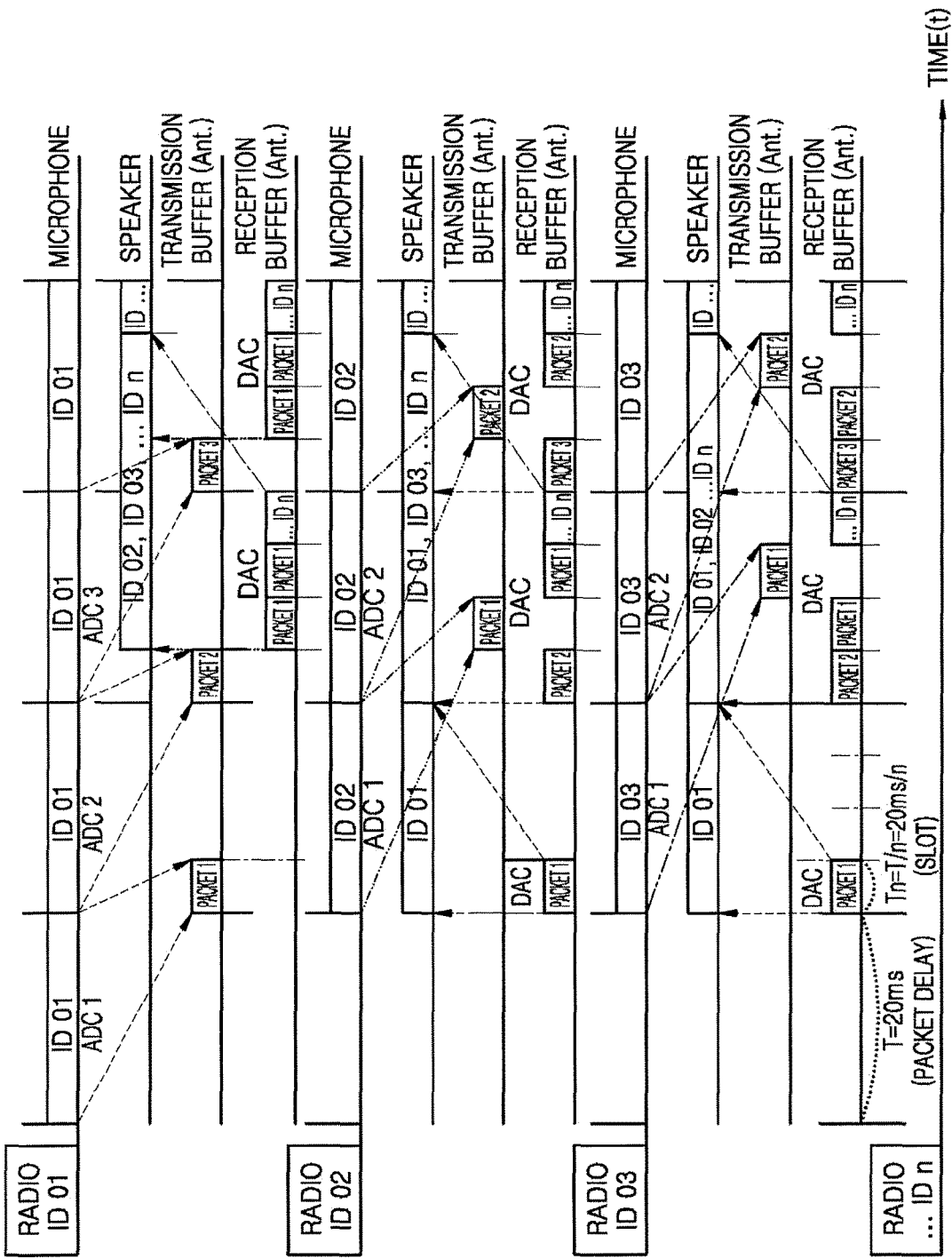

Also, FIGS. 4 to 6 are communication timing diagrams of the wearable wireless communication device according to one embodiment of the present invention. FIG. 4 illustrates an example of transmitting a packet from a wearable wireless communication device whose ID is 01 to another wearable wireless communication device whose ID is 02 through a time-sharing method.

FIG. 5 illustrates a process of performing communication through 1:1 type full duplex and time-sharing packet transmission between the wearable wireless communication device whose ID is 01 and the other wearable wireless communication device whose ID is 02.

FIG. 6 illustrates a process of performing communication through 1:1 type full duplex and time-sharing packet transmission among wearable wireless communication devices whose IDs are 01 to n.

Referring to FIG. 1, the controller 140 may remain in a sleep mode for a preset time in a standby state for receiving signals from other wearable wireless communication devices through the antenna 220 or a standby state for receiving an analog voice signal through the receiver 110 and then may operate in an auto polling mode for a preset time to reduce power consumption while standing by reception by repeating conversions of the sleep mode and the auto polling mode.

Figure 7:
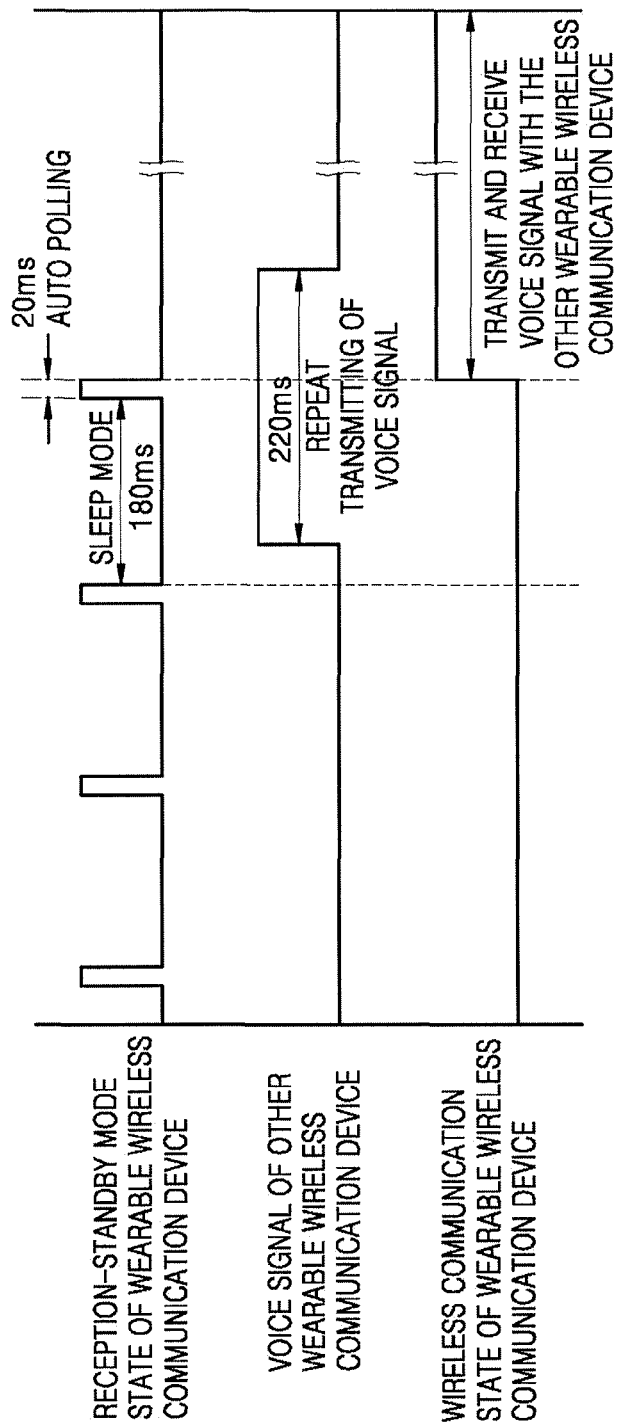
FIG. 7 is a view illustrating an example of a signal standby state in the wearable wireless communication device according to one embodiment of the present invention.

FIG. 7 is a view illustrating an example of a signal standby state in the wearable wireless communication device according to one embodiment of the present invention.

As shown in the drawings, a reception-standby mode of the wearable wireless communication device 100 includes a sleep mode section and an auto polling section. That is, the reception-standby mode of the wearable wireless communication device 100 has one period including the sleep mode section and the auto polling section and the one period of the sleep mode section and the auto polling section is repeatedly performed until a voice signal from another wearable wireless communication device is received. In the embodiment, a setting time of maintaining a sleep mode of the reception-standby mode is set to be 180 ms and a setting time of maintaining auto polling is set to be 20 ms. Also, one period is total 4,000 ms and the corresponding period is repeatedly performed until a voice signal is received from other wearable wireless communication device.

Also, the other wearable wireless communication device may repeatedly transmit a voice signal for 220 ms that is a preset setting time. Accordingly, since a time of 20 ms in which the auto polling is maintained during the reception-standby mode of the wearable wireless communication device 100 overlaps within a range of 220 ms that is a setting time for receiving a voice signal transmitted from other wearable wireless communication device, the wearable wireless communication device 100 receives the voice signal transmitted from the other wearable wireless communication device and then may transmit and receive voice signals with the other wearable wireless communication device 100.

Accordingly, the wearable wireless communication device 100 may greatly reduce power consumption in a reception-standby state through the reception-standby mode using the auto polling method than an existing reception-standby mode of always operating in an active state.

Also, the controller 140 may transmit communication group setting information to other wireless communication devices to allow the wearable wireless communication device 100 to set a communication group with other wireless communication devices within a communication range or a limited range. When to set the communication group with other wearable wireless communication devices within the limited range, the controller 140 may convert the communication group setting information into a dual tone multi-frequency (DTMF) signal and send out the DTMF signal through the voice output portion 180 or may input a certain received signal strength indicator (RSSI) value into the communication group setting information to transmit to the antenna 220. Such operations described above will be described below in detail with reference to FIGS. 13 to 16.

Also, the wireless wearable communication device 100 may further include a case that is a matrix for installing the receiver 110, the first amplifier 120, the A/D converter 130, the controller 140, the RF transceiver 150, the D/A converter 160, the second amplifier 170, and the voice output portion 180.

Figure 8:
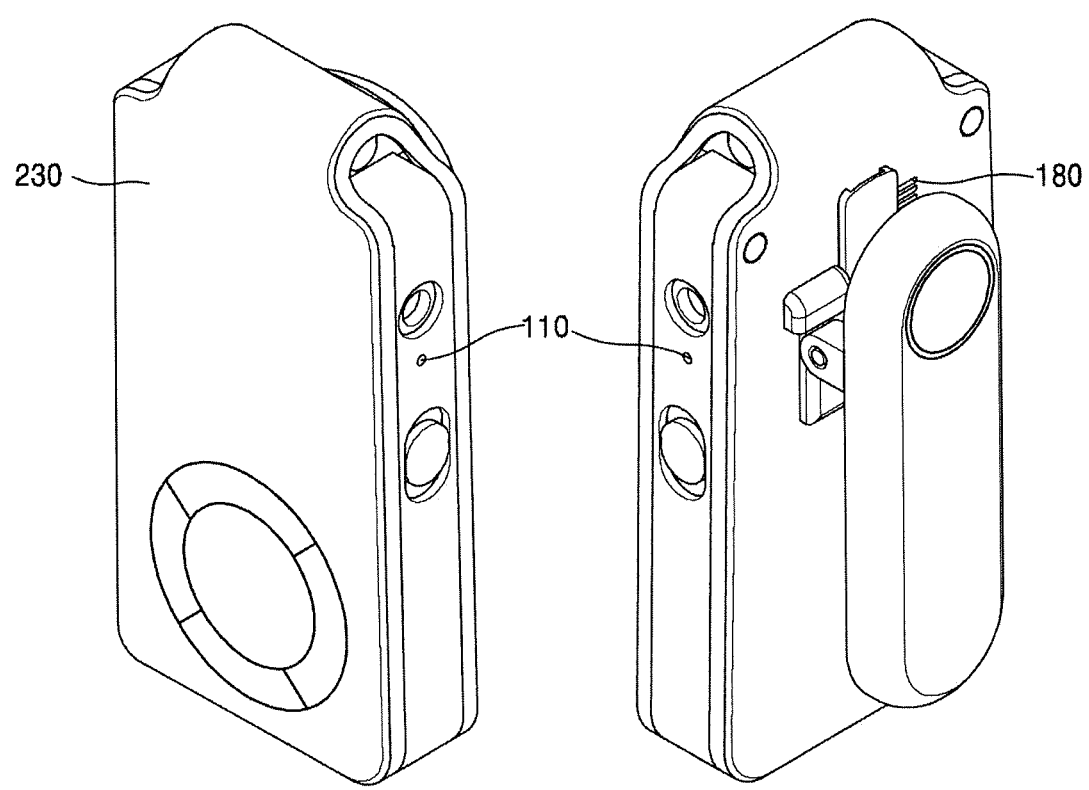
FIG. 8 is a perspective view illustrating an example of a speaker type wearable wireless communication device according to one embodiment of the present invention.

FIG. 8 is a perspective view illustrating an example of a speaker type wireless wearable communication device according to one embodiment of the present invention. As shown in the drawings, a case 230 has a structure for exposing the microphone 110, the speaker 180, an earphone port and the like and includes a strap connector and a detachable clip to be attached to user's clothing. However, the present invention is not limited thereto.

Figure 9:
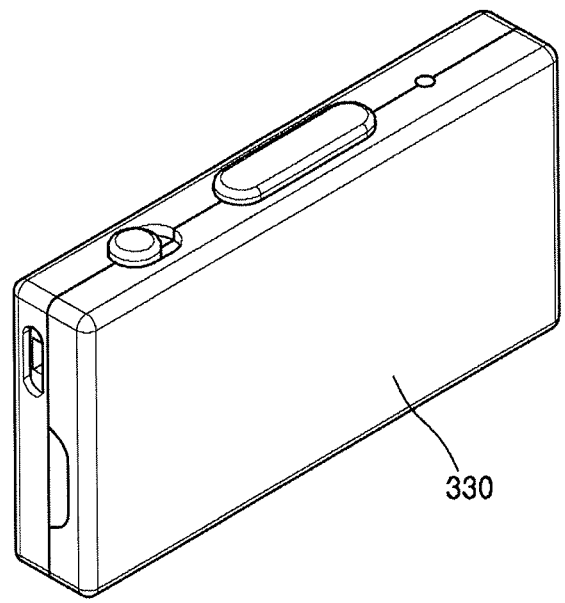
FIG. 9 is a perspective view illustrating an example of an earphone type wearable wireless communication device according to one embodiment of the present invention.

Also, FIG. 9 is a perspective view illustrating an example of an earphone type wireless wearable communication device according to one embodiment of the present invention. As shown in the drawing, a case 330 has a structure for exposing an earphone port without an external speaker and a microphone. However, the present invention is not limited thereto.

As is apparent from the above configuration, the wearable wireless communication device 100 may perform transmission and reception at the same time using the time sharing method and the like through the full duplex function of the controller 140.

Also, since communication is available only among wearable wireless communication devices in the communication group set through performing a division function by a code combination, the communication among the wearable wireless communication devices in the corresponding communication group may be performed in a clear state in which noise and miscommunication are maximally prevented.

Also, power consumption in the reception-standby state may be greatly reduced using a function of the controller 140 in which one period of the reception-standby state that includes a sleep mode and an auto polling mode is repeated.

Also, using the comparator 190 and a function of the controller 140 for determining whether an analog voice signal is present in a signal input through the receiver 110 through a signal of the comparator 190, the user of the wearable wireless communication device 100 may automatically send out a voice signal input to the receiver 110 through the RF transceiver 150 of the wearable wireless communication device 100 and the antenna 220 without additionally operating a PTT button and the like for inputting a voice.

Also, the wearable wireless communication device 100 is easily wearable according to applying of the case 230 or 330 that is ergonomically designed, and there is no additional inconvenience due to a light weight of the case 230 or 330 even when the wearable wireless communication device 100 is used for a long time.

Next, referring to FIGS. 10 to 18, a wireless communication method according to one embodiment of the present invention will be described.

Before description, the wearable wireless communication device 100 described above with reference to FIGS. 1 to 9 is an example of a wearable wireless communication device used in the wireless communication method according to one embodiment of the present invention. Accordingly, in the following description, corresponding components of the wearable wireless communication device will be referred to as the like reference numerals as those of the wearable wireless communication device described above with reference to FIGS. 1 to 9.

Figure 10:
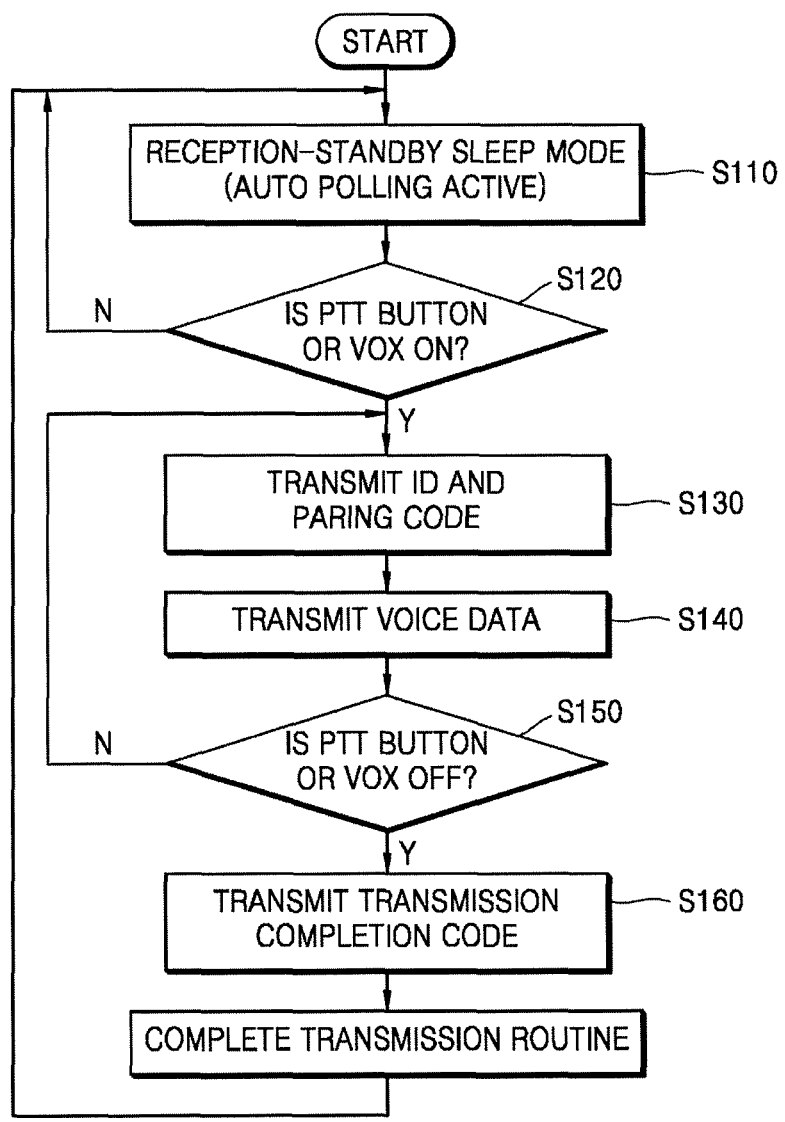
FIG. 10 is a flowchart illustrating a signal transmission process in a wireless communication method of the wearable wireless communication device according to one embodiment of the present invention.

FIG. 10 is a flowchart illustrating a signal transmission process in a wireless communication method of the wireless wearable communication device according to one embodiment of the present invention.

As shown in the drawing, in operation S110, the receiver 110 stands by the input of an analog voice signal.

In operation S120, the controller 140 determines whether a PTT signal is input through the input portion 200 or whether a voice data existence signal is input through the comparator 190.

In operation S130, when it is determined that there is the input of the PTT signal through the input portion 200 or there is the input of the voice data existence signal through the comparator 190, the controller 140 outputs an ID and a paring code of the wearable wireless communication device 100 to the RF transceiver 150.

In operation S140, the controller 140 outputs a digital voice signal input through the receiver 110 and then converted at the A/D converter 130 to the RF transceiver 150.

Through the operations S130 and S140, the ID and the pairing code of the wearable wireless communication device 100 and the digital voice signal are transmitted to another wearable wireless communication device through the antenna 220.

In operation S150, the controller 140 determines whether the input of the PTT signal stops or whether the input of the voice data existence signal through the comparator 190 stops.

In operation S160, when it is checked that the stop of the input of the PTT signal or the stop of the input of the voice data existence signal through the comparator 190, the controller 140 outputs a transmission completion code to the RF transceiver 150. Accordingly, the transmission completion signal is transmitted to the other wearable wireless communication device through the antenna 220 of the wearable wireless communication device 100. According thereto, a transmission routine between the wearable wireless communication devices is completed.

Next, referring to FIG. 11, a signal reception process in the wireless communication method of the wearable wireless communication device according to one embodiment of the present invention will be described.

Figure 11:
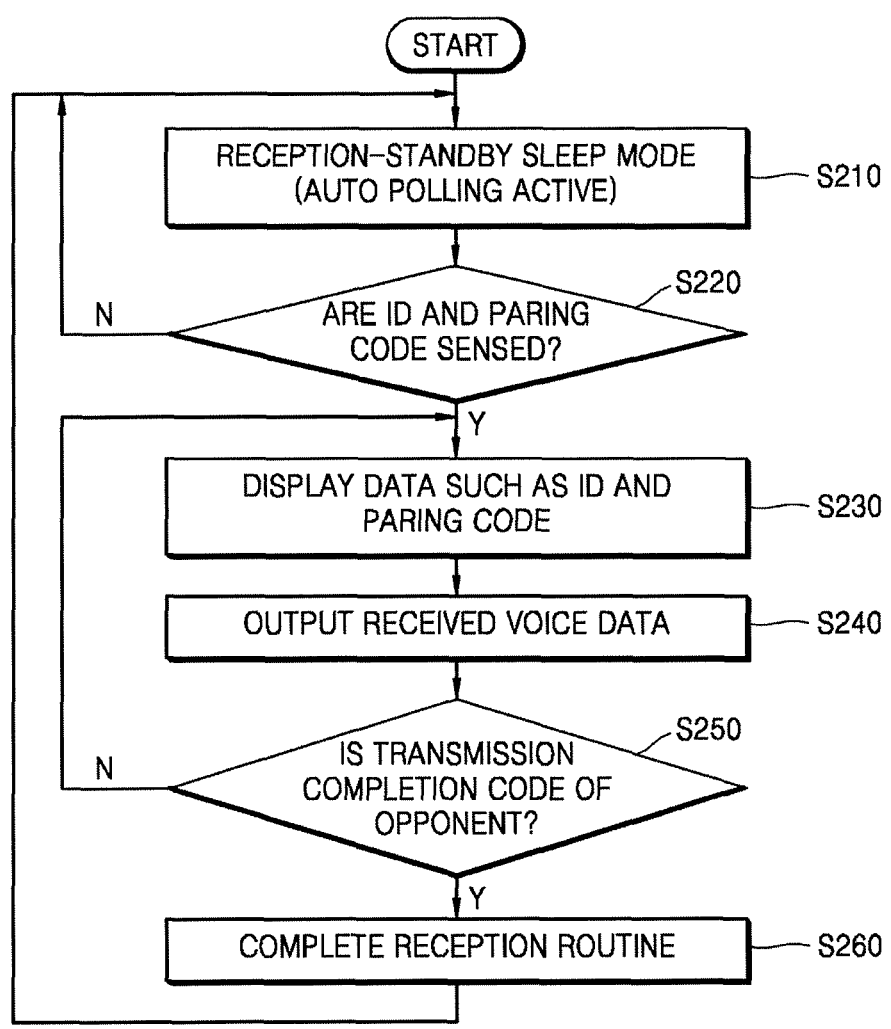
FIG. 11 is a flowchart illustrating a signal reception process in a wireless communication method of the wearable wireless communication device according to one embodiment of the present invention.

FIG. 11 is a flowchart illustrating a signal reception process in the wireless communication method of the wireless wearable communication device according to one embodiment of the present invention.

As shown in the drawing, in operation S210, the antenna 220 stands by the input of a digital voice signal.

In operation S220, the controller 140 determines whether an ID and a paring code of another wearable wireless communication device are included in a signal input through the antenna 220.

In operation S230, when it is determined that the ID and the paring code of the other wearable wireless communication device are included in the signal input through the antenna 220, the controller 140 displays the ID and the pairing code of the other wearable wireless communication device that are input, on the display portion 210.

In operation S240, the controller 140 outputs the digital voice signal of the other wearable wireless communication that is input, to the D/A converter 160 and an analog voice signal obtained through conversion at the D/A converter 160 is input through the voice output portion 180.

In operation S250, the controller 140 determines whether a transmission completion code is included in a transmission signal of the other wearable wireless communication device.

In operation S260, when it is determined that the transmission completion code is included in the transmission signal of the other wearable wireless communication device, the controller 140 completes a signal reception operation.

Next, referring to FIG. 12, a full duplex communication process in the wireless communication method of the wearable wireless communication device according to one embodiment of the present invention will be described.

Figure 12:
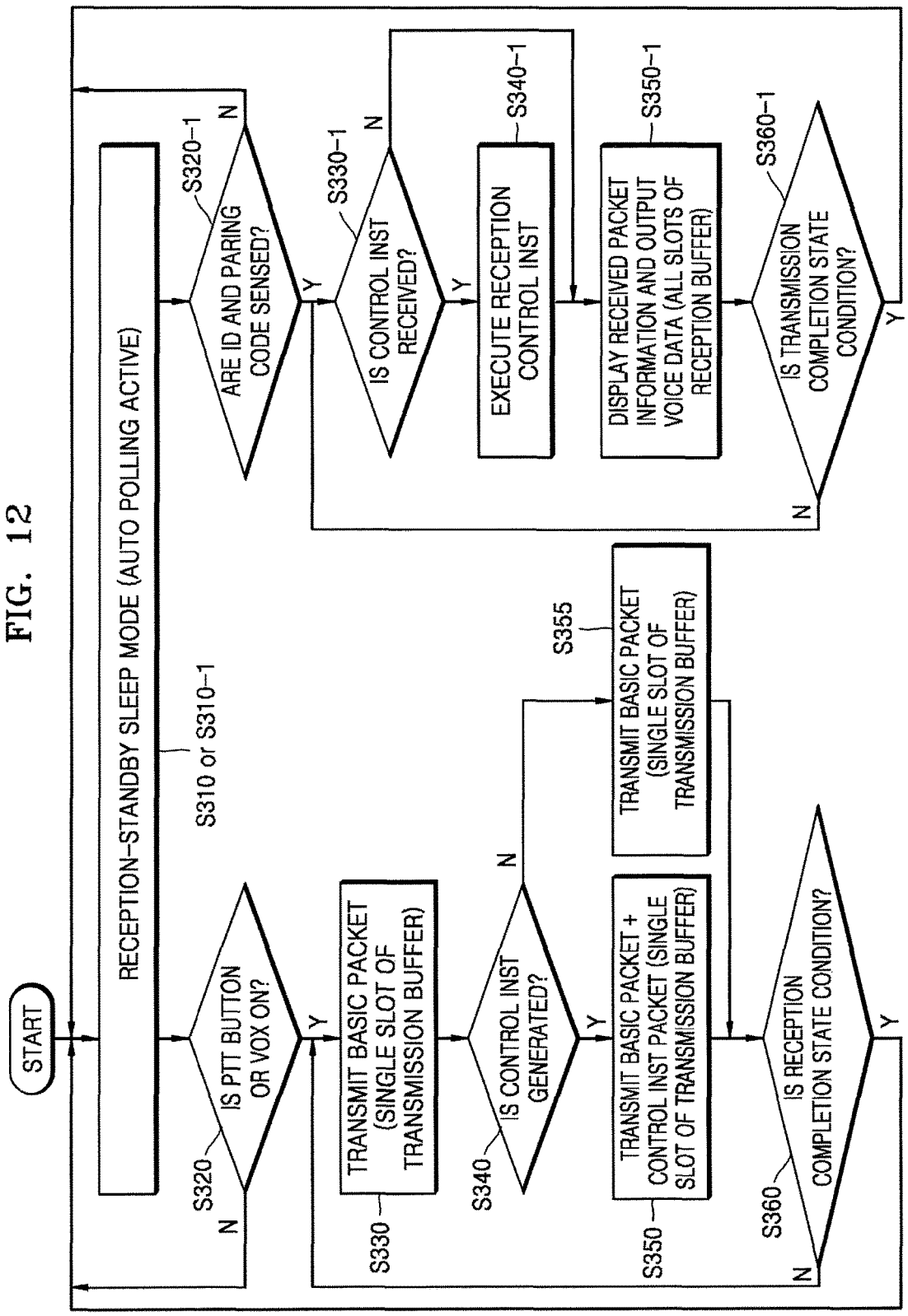
FIG. 12 is a flowchart illustrating a process of performing full duplex communication in the wireless communication method of the wearable wireless communication device according to one embodiment of the present invention.

FIG. 12 is a flowchart illustrating a process of performing full duplex communication in the wireless communication method of the wireless wearable communication device according to one embodiment of the present invention.

First, to describe a transmission routine, in operation S310, the receiver 110 stands by the input of an analog voice signal.

In operation S320, the controller 140 determines whether a PTT signal is input through the input portion 200 or whether a voice data existence signal is input through the comparator 190.

In operation S330, when the PTT signal is input or the voice data existence signal is input, the controller 140 outputs a basic packet to the RF transceiver 150.

In operation S340, the controller 140 determines whether to generate a control INST.

In operation S350, when it is determined to generate the control INST, the controller 140 outputs the basic packet including a control INST packet to the RF transceiver 150. Otherwise, in operation S355, when it is determined not to generate the control INST, the controller 140 continuously outputs the basic packet to the RF transceiver 150.

In operation S360, the controller 140 determines whether transmission is completed, that is, whether the other wearable wireless communication device remains in a condition of completing reception.

Also, when the controller 140 determines that transmission is completed, the receiver 110 returns to operation before the operation of standing by the input of the analog voice signal. When the controller 140 determines that transmission is not completed as well as the PTT signal is input or the voice data existence signal is input, the controller 140 returns to operation before the operation of outputting the basic packet to the RF transceiver 150.

Next, to describe a reception routine, in operation S310-1, the antenna 220 stands by the input of a digital voice signal.

In operation S320-1, the controller 140 determines whether an ID and a paring code of another wearable wireless communication device are included in a signal input through the antenna 220.

In operation S330-1, when it is determined that the ID and the pairing code of the other wearable wireless communication device are included in the signal received at the antenna 220, the controller 140 determines whether a control INST and the corresponding signal are received together.

In operation S340-1, when it is determined that the control INST is received together, the controller 140 executes the control INST.

In operation S350-1, reception packet information is output through the display portion 210 and voice data is output through the voice output portion 180 according to the executing of the control INST by the controller 140.

In operation S360-1, the controller 140 determines whether reception is completed, that is, whether the other wearable wireless communication device remains in a condition of completing transmission.

Also, when it is determined that the reception is completed, the controller 140 returns to operation before the operation of standing by the input of the digital voice signal at the antenna 220. When it is determined that the reception is not completed, the controller 140 as well as it is determined that the ID and the pairing code of the other wearable wireless communication device are included in the signal received at the antenna 220, the controller 140 returns to operation before the operation of determining whether the control INST and the corresponding signal are received together.

Figure 13:
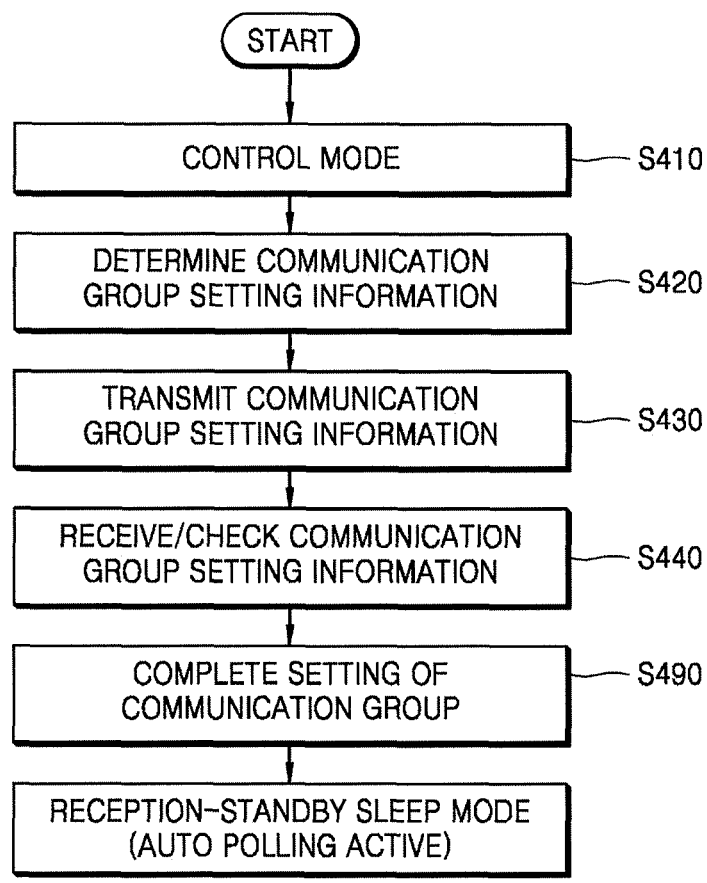
FIG. 13 is a flowchart illustrating a communication group setting method according to one embodiment of the present invention.

FIG. 13 is a flowchart illustrating a communication group setting method according to one embodiment of the present invention.

In S410, the wearable wireless communication device 100 intended to set a communication group is set as a control mode.

In operation S420, the controller 140 of the wearable wireless communication device 100 determines communication group setting information of the communication group to be set. The communication group setting information may include, for example, an ID, a paring code, a master, a slave, a control INST and the like of a wireless communication device to be included in the communication group.

In operation S430, the controller 140 of the wearable wireless communication device 100 transmits the communication group setting information through the RF transceiver 150 and the antenna 220.

In operation S440, other wireless communication devices receive the communication group setting information and check the received communication group setting information when there is a group participation permission (or an implied permission).

In operation S490, the other wireless communication devices store and set the received communication group setting information in such a way that a communication group including the wearable wireless communication device 100 and the other wireless communication devices is set.

Also, the wearable wireless communication device 100 and the other wireless communication devices convert into a reception-standby mode. Then, it comes to a state in which communication is available among the wireless communication devices included in the communication group.

According to the communication group setting method according to the embodiment of FIG. 13, it is possible to set a communication group among wireless communication devices within a range of transmitting communication group setting information, that is, within a communication range of the wearable wireless communication device 100 intended to set the communication group. However, occasionally, it is necessary to set a communication group among wireless communication devices within a limited range smaller than a so-called private communication group, that is, a wireless communication range. For example, a communication group of people gather within several meters or several ten meters is set. In the communication group setting method according to the embodiment of FIG. 13, since communication group setting information is transferred to all wireless communication devices within a communication range, it is afraid that people who wound not like to join in the communication group or people who are not supposed to be included in the communication group for security reasons are included in the communication group. Other embodiments of the present invention provide a communication group setting method capable of effectively setting a communication group among wireless communication devices within a limited range smaller than a wireless communication range.

Figure 14:
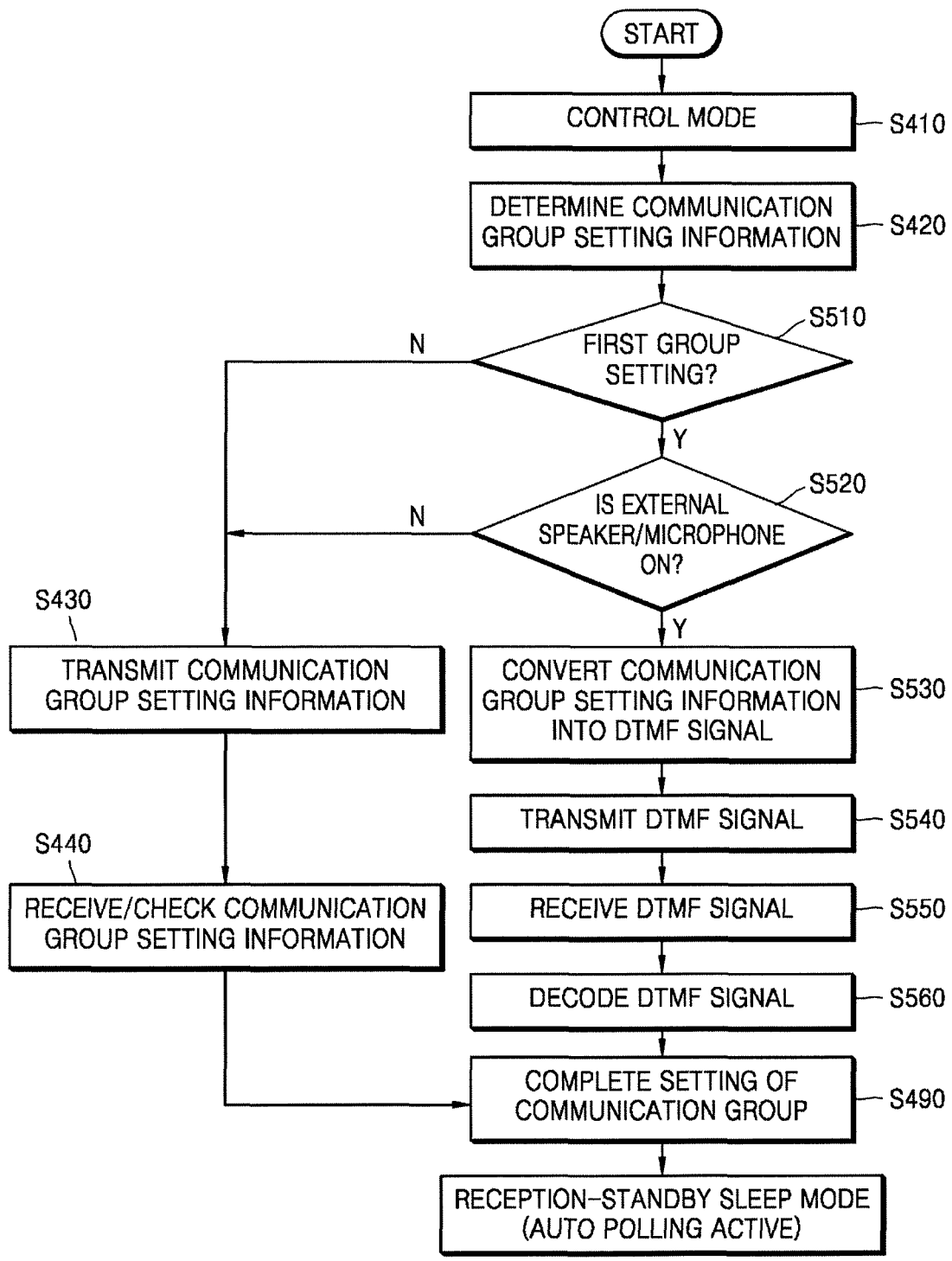
FIG. 14 is a flowchart illustrating a communication group setting method according to another embodiment of the present invention.

FIG. 14 is a flowchart illustrating a communication group setting method according to another embodiment of the present invention.

In S410, the wearable wireless communication device 100 intended to set a communication group is set as a control mode.

In operation S420, the controller 140 of the wearable wireless communication device 100 determines communication group setting information of the communication group to be set. The communication group setting information may include, for example, an ID, a paring code, a master, a slave, a control INST and the like of a wireless communication device to be included in the communication group.

In operation S510, the controller 140 of the wearable wireless communication device 100 determines whether setting of the communication group is a first group setting. Here, when the communication group is already set, the setting may not be determined as the first group setting. When the communication group is not currently set, the setting may be determined as the first group setting.

When the setting is not the first group setting, like the embodiment of FIG. 13, the controller 140 of the wearable wireless communication device 100 transmits the communication group setting information through the RF transceiver 150 and the antenna 220 (operation S430). In this case, in operation S430, new communication group setting information may be transmitted to the wireless communication devices in the communication group that is already set.

When the setting is the first group setting, in operation S520, as described below, the controller 140 of the wearable wireless communication device 100 transmits communication group setting information to wireless communication devices within a limited range using a DTMF signal. In the embodiment, the DTMF signal is sent out as a voice through the voice output portion 180, for example, a speaker. However, since the voice reaches only a limited distance, it is possible to set a communication group among the wireless communication devices within the limited range.

In operation S520, the controller 140 of the wearable wireless communication device 100 checks whether an external speaker and a microphone of the wearable wireless communication device 100 are in an ON state. Since it is impossible to send out the voice when the external speaker and the microphone are not in the ON state, the controller 140 of the wearable wireless communication device 100 transmits the communication group setting information through the RF transceiver 150 and the antenna 220 (operation S430).

When the external speaker and the microphone are in the ON state, the controller 140 of the wearable wireless communication device 100 converts the communication group setting information into a DTMF signal. For example, when the DTMF signal has a frequency component with a 4×4 matrix, a hexadecimal number value may be shown using an overlapped tone (a combination of two frequencies).

FIG. 15 is a view illustrating an example of a DTMF signal. Each line indicates a low frequency component, and each column indicates a radio frequency component. As shown in the drawing, hexadecimal numbers from 0 to F may be shown with the frequency component of the 4×4 matrix. For example, when eight pieces of hexadecimal data such as an ID, a paring code, a master, a slave, a control INST and the like of a wireless communication device to be included in a communication group are necessary as the communication group setting information, it is necessary merely to generate eight DTMF signals (overlapped tones).

In operation S540, the controller of the wearable wireless communication device 100 sends out the DTMF signal through the voice output portion 180. For example, eight overlapped tones are sequentially sent out through the voice output portion 180.

Then, in operation S550, other wireless communication devices around the wearable wireless communication device 100 receive the DTMF signal using receivers, for example, microphones. Depending on a volume of a sound output through the voice output portion 180 of the wearable wireless communication device 100 and the sensitivity of the receivers 110 of the other wireless communication devices, the DTMF signal may be transferred within several meters to a dozen or more meters. Accordingly, it is possible to set a communication group among wireless communication devices within a range of several meters to a dozen or more meters. When a frequency of the DTMF signal is in an ultrasonic band, it is possible transmit and receive the DTMF signal even at a place where there is a lot of ambient noise.

In operation S560, the controller 140 of the other wireless communication devices that receive the DTMF signal, the communication group setting information is obtained by decoding the received DTMF signal when there is a group participation permission (or an implied permission) from the user. For example, the controllers of the other wireless communication devices may obtain the communication group setting information by restoring corresponding hexadecimal data from the received DTMF signal.

In operation S490, the other wireless communication devices store and set the obtained communication group setting information in such a way that a communication group including the wearable wireless communication device 100 and the other wireless communication devices is set.

Also, the wearable wireless communication device 100 and the other wireless communication devices convert into a reception-standby mode. Then, it comes to a state in which communication is available among the wireless communication devices included in the communication group.

Figure 16:
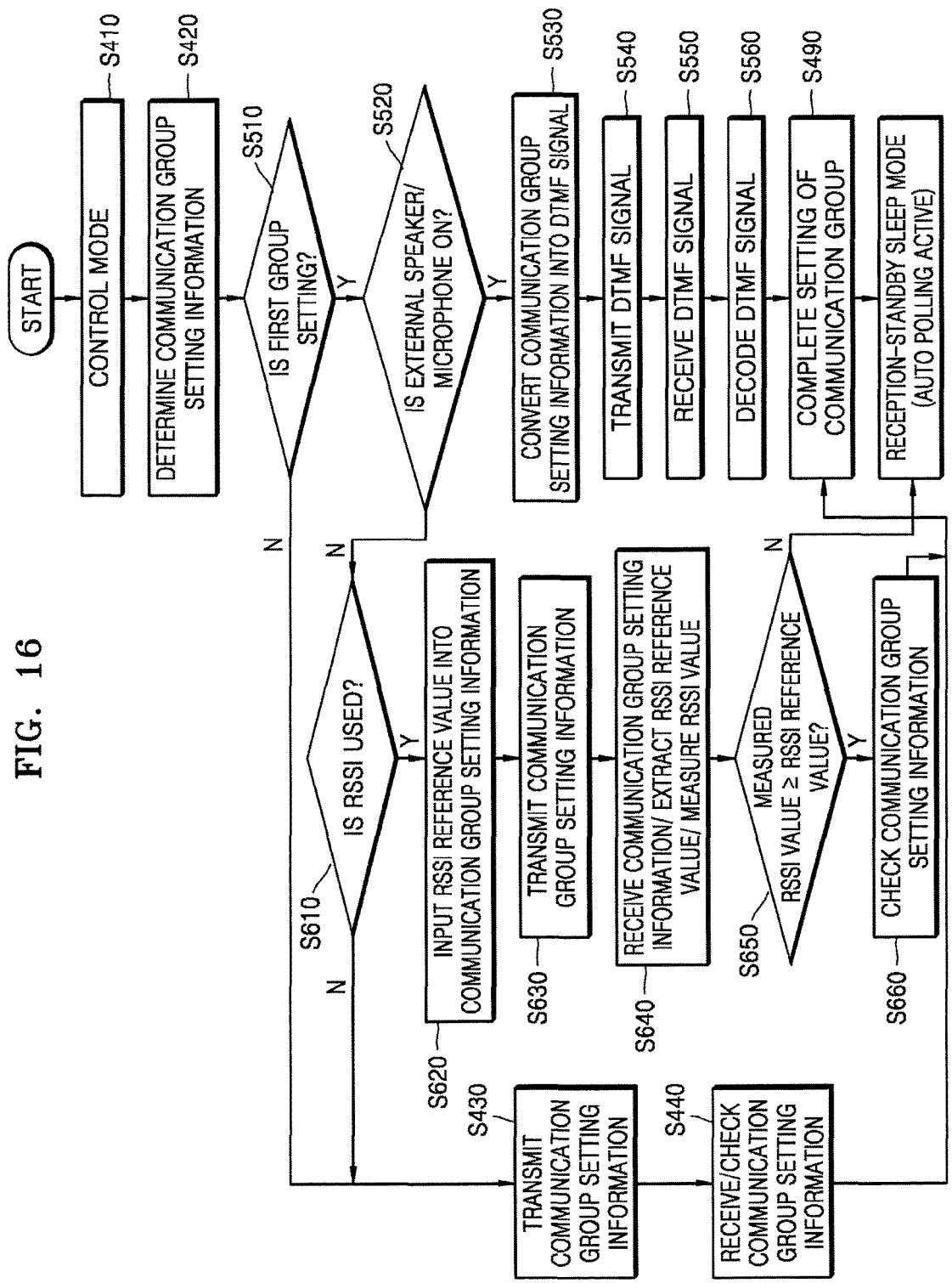
FIG. 16 is a flowchart illustrating a communication group setting method according to still another embodiment of the present invention.

FIG. 16 is a flowchart illustrating a communication group setting method according to still another embodiment of the present invention.

In S410, the wearable wireless communication device 100 intended to set a communication group is set as a control mode.

In operation S420, the controller 140 of the wearable wireless communication device 100 determines communication group setting information of the communication group to be set. The communication group setting information may include, for example, an ID, a paring code, a master, a slave, a control INST and the like of a wireless communication device to be included in the communication group.

In operation S510, the controller 140 of the wearable wireless communication device 100 determines whether setting of the communication group is a first group setting. Here, when the communication group is already set, the setting may not be determined as the first group setting. When the communication group is not currently set, the setting may be determined as the first group setting.

When the setting is not the first group setting, like the embodiment of FIG. 13, the controller 140 of the wearable wireless communication device 100 transmits the communication group setting information through the RF transceiver 150 and the antenna 220 (operation S430). In this case, in operation S430, new communication group setting information may be transmitted to the wireless communication devices in the communication group that is already set.

When the setting is the first group setting, in operation S520, the controller 140 of the wearable wireless communication device 100 checks whether an external speaker and a microphone of the wearable wireless communication device 100 are in an ON state. When the external speaker and the microphone are in the ON state, like the embodiment of FIG. 14, the controller 140 of the wearable wireless communication device 100 converts the communication group setting information into a DTMF signal (operation S530) and sends out the DTMF signal through the voice output portion 180 (operation S540).

In operation S520, since it is impossible to use the DTMF signal without an external speaker and a microphone, the controller 140 of the wearable wireless communication device 100 performs operation S610 and transmits the communication group setting information including a certain RSSI reference value operation S610 as described below. Then, another wireless communication device that receives the RSSI reference value may compare the RSSI reference value with a measured RSSI value and may determine whether to participate in the communication group according to a result thereof. Since the measured RSSI value depends on a distance, performing like this, it is possible to set a communication group among wireless communication devices within a limited range.

Depending on embodiments, regardless of availability of an external speaker and a microphone, the DTMF signal may not be used and an RSSI value may be used. In this case, the operations S520 to S560 are omitted from the flowchart of FIG. 16 and operation S610 may be performed directly when the setting is the first group setting in operation S510.

In operation S510, the controller 140 of the wearable wireless communication device 100 determines whether to use the RSSI value in the setting of the communication group. Here, depending on a user command or a preset setting, it may be determined whether to use the RSSI value. When it is determined not to use the RSSI value, the controller 140 of the wearable wireless communication device 100 transmits the communication group setting information through the RF transceiver 150 and the antenna 220 (operation S430).

When it is determined to use the RSSI value, in operation S620, the controller 140 of the wearable wireless communication device 100 inputs a certain RSSI reference value into the communication group setting information. As described above, the communication group setting information may include a control INST, for example, it is possible to input the RSSI reference value into the Reserve1 or Reserve2 area of the control INST packet shown in FIG. 3.

In operation S630, the controller 140 of the wearable wireless communication device 100 transmits the communication group setting information including the RSSI reference value through the RF transceiver 150 and the antenna 220.

Then, in operation S640, other wireless communication devices receive the communication group setting information including the RSSI reference value through antennas and controllers of the other wireless communication devices extract the RSSI reference value from the received communication group setting information and, on the other hand, measure RSSI values of received signals.

In operation S650, the controllers of the other wireless communication devices compare the measured RSSI values with the RSSI reference value extracted from the communication group setting information and determine whether the measured RSSI values are the RSSI reference value or more.

When a measured RSSI value of a case in which a wireless communication device of a transmission side and a wireless communication device of a reception side are very close to each other is referred to as a maximum RSSI value, generally, an RSSI value measured at a short distance of several meters is 90 to 95% of the maximum RSSI value and an RSSI value measured at a maximum communication distance of a wireless communication device is 5 to 10% of the maximum RSSI value. Accordingly, the RSSI reference value may be determined as a value adequate according to a range for setting the communication group and may be changed according to user settings. For example, when the range for setting the communication group is several meters, the RSSI reference value may be determined as 90% of the maximum RSSI value.

In operation S650, when a measured RSSI value is determined to be the RSSI reference value or more, in operation S660, the controllers of the other wireless communication devices check the received communication group setting information and obtain the communication group setting information such as an ID, a paring code, a master, a slave, a control INST and the like of a wireless communication device to be included in the communication group.

Then, in operation S490, the other wireless communication devices store and set the communication group setting information in such a way that a communication group including the wearable wireless communication device 100 and the other wireless communication devices is set.

Also, the wearable wireless communication device 100 and the other wireless communication devices convert into a reception-standby mode. Then, it comes to a state in which communication is available among the wireless communication devices included in the communication group.

Figure 17:
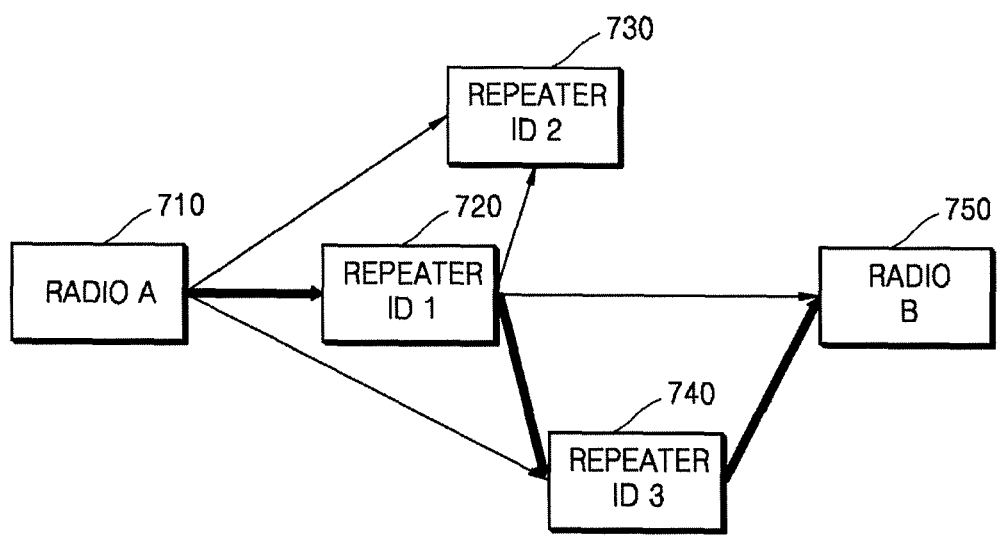
FIG. 17 is a view illustrating an example in which the wearable wireless communication device according to one embodiment of the present invention operates as a repeater or a relay.

FIG. 17 is a view illustrating an example in which the wireless wearable communication device according to one embodiment of the present invention operates as a repeater or a relay.

The repeater means a relay function of shaping a waveform or amplifying such as regenerating a decreased signal or increasing output for long-distance transmission of a wireless signal to be transmitted.

The relay means a function of extending a communication distance or the number of communication terminals by providing one or more repeaters between a transmitting end and a receiving end in a wireless communication network.

In the embodiment of the present invention, the wearable wireless communication device 100 may be set to be a repeater mode. In the repeater mode, the controller 140 may change a transmission/reception ID and may amplify a wireless signal received through the antenna 220 with certain power and transmit the amplified wireless signal through the antenna 220 again. Here, two or more wireless communication devices in the repeater mode that receive the wireless signal may compare strengths of receiving power through communication to allow a wireless communication device having the greatest receiving power may perform the repeater function.

For example, referring to FIG. 17, when wireless communication devices ID1, ID2, and ID3 720, 730, and 740 are set to be the repeater mode, a wireless communication device A 710 transmits a wireless signal. A wireless communication device B 750 is at a long distance from the wireless communication device A 710 and may not directly receive the wireless signal.

Each of the wireless communication devices ID1, ID2, and ID3 720, 730, and 740 receives a signal from the wireless communication device A 710 and compares strength of receiving power through communication. Then, the wireless communication device ID1 720 having the greatest receiving power amplifies and transmits the signal from the wireless communication device A 710 again. Each of the wireless communication devices ID2 and ID3 730 and 740 receives a signal from the wireless communication device ID1 720 and compares strength of receiving power through communication. Then, the wireless communication device ID3 740 having the greatest receiving power amplifies and transmits the signal from the wireless communication device ID1 720 again. Then, the wireless communication device B 750 receives a wireless signal from the wireless communication device ID3 740. Occasionally, the wireless communication device B 750 may receive the signal transmitted from the wireless communication device ID1 720. However, since strength of the signal received from the wireless communication device ID3 740 is stronger, the signal received from the wireless communication device ID3 740 is selected.

Finally, the signal transmitted by the wireless communication device A 710 is transmitted to the wireless communication device B 750 via the wireless communication device ID3 740. On the other hand, the signal transmitted by the wireless communication device B 720 is transmitted to the wireless communication device A 710 via the wireless communication device ID1 720.

Figure 18:
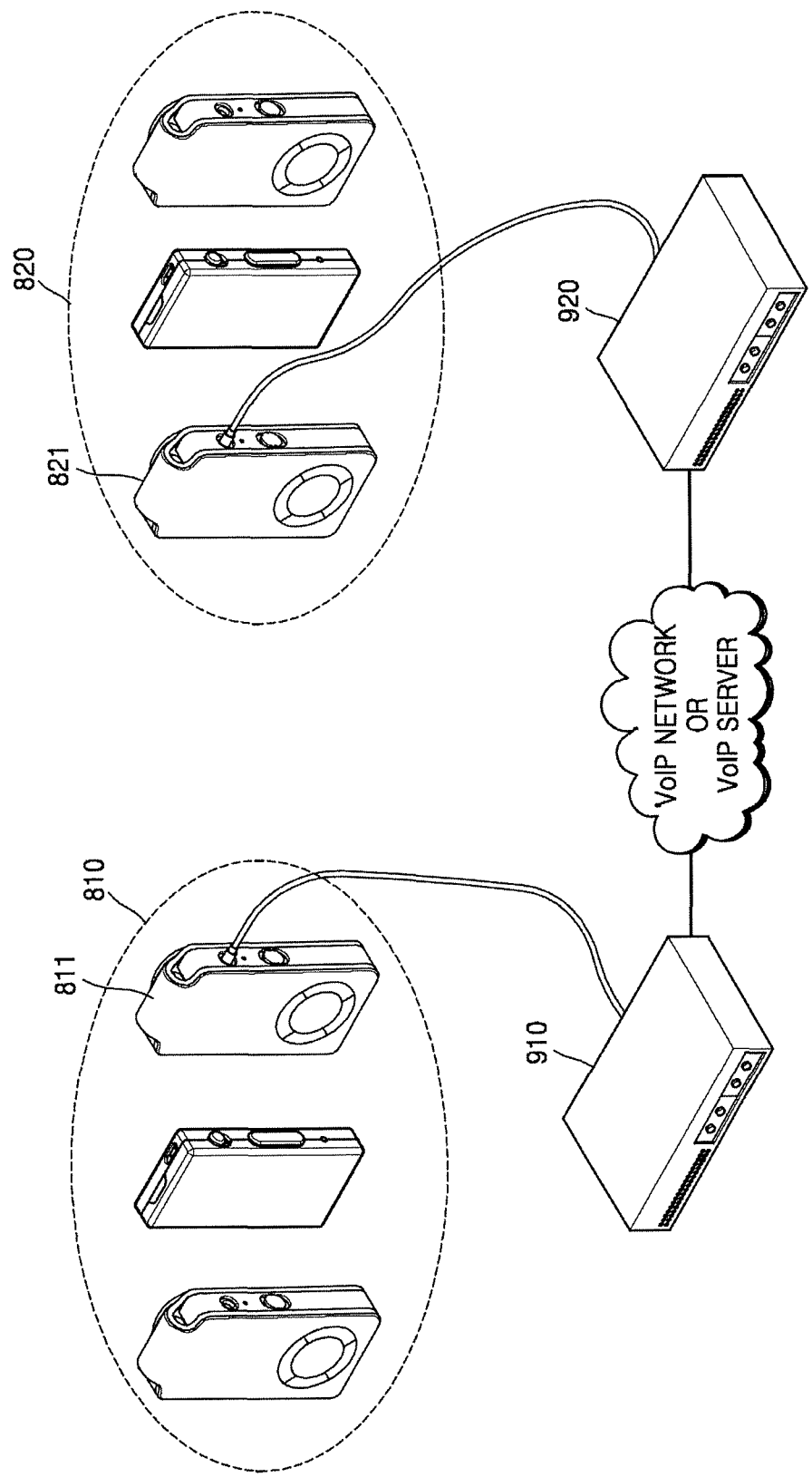
FIG. 18 is a view illustrating a state in which the wearable wireless communication device according to one embodiment of the present invention operates as a donor radio.

FIG. 18 is a view illustrating an example in which the wireless wearable communication device according to one embodiment of the present invention operates as a donor radio.

The donor radio means a function of transmitting a signal outside a VoIP network through a VoIP apparatus such as a gateway, a switch, a router and the like or receives a signal from the VoIP network through a VoIP apparatus and transmits the signal to the outside of the VoIP network. Through this function, the wearable wireless communication device according to the embodiment of the present invention may communicate with wireless communication devices in any areas in the world connected to the VoIP network.

In the embodiment of the present invention, to enable the wearable wireless communication device 100 to operate as the donor radio, the controller 140 may transmit a signal from a VoIP apparatus such as a gateway, a switch, a router and the like through the antenna 220 or may transmit a signal received from another wireless communication device through the antenna 220 to a VoIP apparatus such as a gateway, a switch, a router and the like to transmit the signal inside the VoIP network.

For example, referring to FIG. 18, a first VoIP apparatus 910 and a second VoIP apparatus 920 are connected to a VoIP network or a VoIP server and a first wireless communication device 811 of a first communication group 810 is connected to the first VoIP apparatus 910 and a second wireless communication device 821 of a second communication group 820 is connected to the second VoIP apparatus 920. That is, the first wireless communication device 811 and the second wireless communication device 821 operate as donor radios. The first and second wireless communication devices 811 and 821 may be connected to the first and second VoIP apparatuses 910 and 920 respectively and may transmit and receive signals through audio input/output ports (corresponding to the receiver 110 and the voice output portion 180 of FIG. 1). Depending on embodiments, the first and second wireless communication devices 811 and 821 and the first and second VoIP apparatuses 910 and 920 may transmit and receive signals through wireless communication.

When a signal is received from the first VoIP apparatus 910, the first wireless communication device 811 transmits the corresponding signal to other wireless communication devices in the first communication group 810. When signals are received from the other wireless communication devices in the first communication group 810, the first wireless communication device 811 transmits the corresponding signals to the first VoIP apparatus 910.

Likewise, when a signal is received from the second VoIP apparatus 920, the second wireless communication device 821 transmits the corresponding signal to other wireless communication devices in the second communication group 820. When signals are received from the other wireless communication devices in the second communication group 820, the second wireless communication device 821 transmits the corresponding signals to the second VoIP apparatus 920.

Accordingly, a signal transmitted by the wireless communication device in the first communication group 810 is transmitted to the wireless communication devices in the second communication group 820 via the first wireless communication device 811, the first VoIP apparatus 910, the VoIP network, the second VoIP apparatus 920, and the second wireless communication device 821. Also, a signal transmitted by the wireless communication device in the second communication group 820 is transmitted to the wireless communication devices in the first communication group 810 via the second wireless communication device 821, the second VoIP apparatus 920, the VoIP network, the first VoIP apparatus 910, and the first wireless communication device 811.

Accordingly, the wireless communication devices of the first communication group 810 and the wireless communication devices of the second communication group 820 may communicate with one another as belonging to one communication group.

Figure 19:
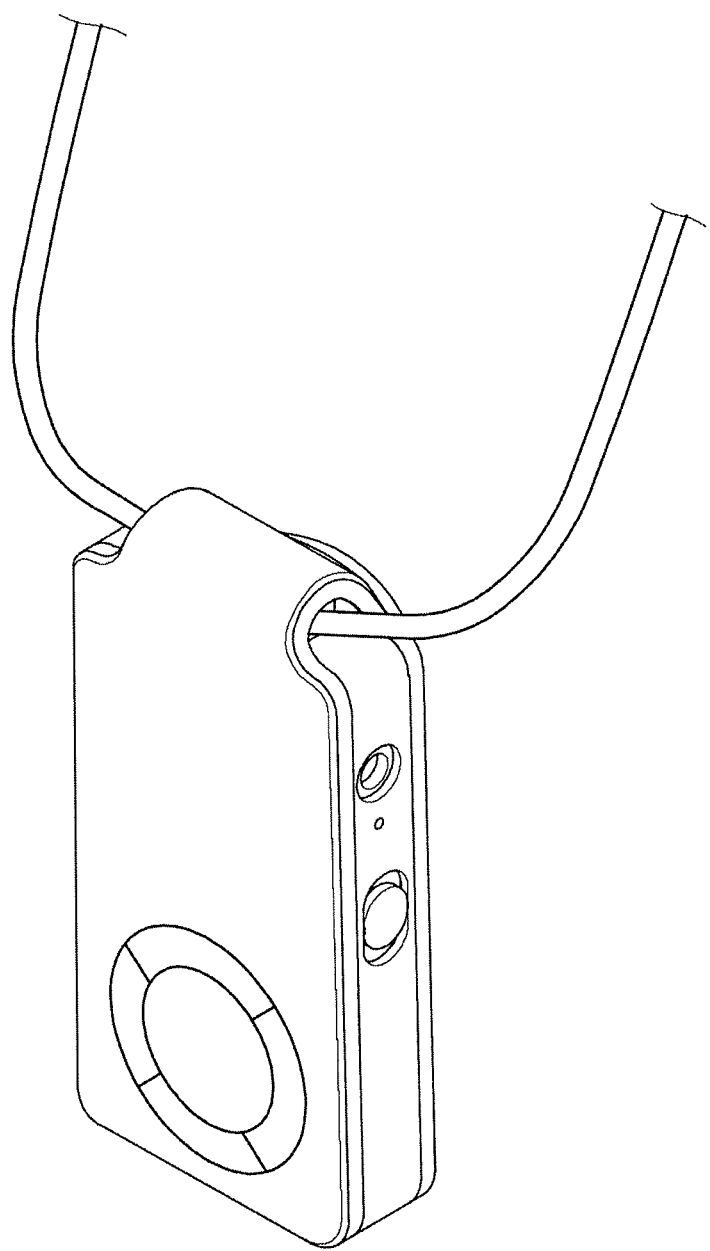
FIG. 19 is a view illustrating a state in which a strap is connected to a case of the speaker type wearable wireless communication device of FIG. 8.
Figure 20:
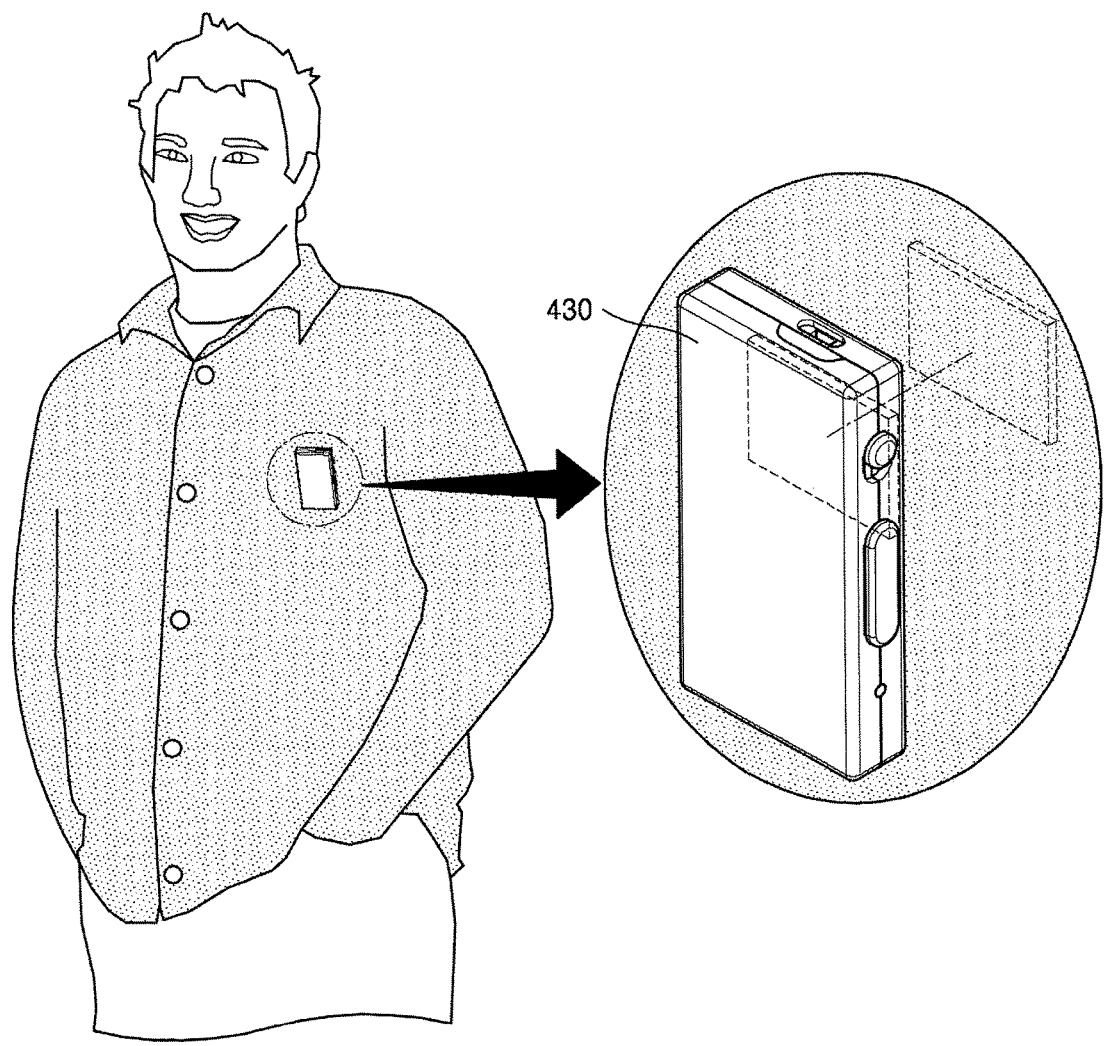
FIG. 20 is a view illustrating a structure in which the earphone type wearable wireless communication device of FIG. 9 is attached to user's clothing.

Meanwhile, FIGS. 19 and 20 illustrate structures for attaching the wearable wireless communication device according to one embodiment of the present invention to a body or user's clothing.

FIG. 19 is a view illustrating a state in which a strap is connected to a case of the speaker type wireless wearable communication device of FIG. 8. As shown in the drawing, it is possible to wear the speaker type wireless communication device around a neck by connecting a strap thereto. Also, as shown in FIG. 8, it is possible to attach the wearable wireless communication device to user's clothing and the like using a clothespin type clip.

FIG. 20 is a view illustrating a structure in which the earphone type wireless wearable communication device of FIG. 9 is attached to user's clothing. As shown in the drawing, the case of the earphone type wearable wireless communication device includes a magnet to be attached to a magnet (or a metal piece) provided at the user's clothing to be attached to the user's clothing. Like FIG. 20, it is possible to attach the speaker type wearable wireless communication device of FIG. 8 to the user's clothing using a magnet.

According to the embodiments of the present invention, a wearable wireless communication device may perform transmission and reception at the same time using a time sharing method through a full duplex function.

Also, a wearable wireless communication device may clearly perform communication among the wearable wireless communication devices in the corresponding communication group without noise and miscommunication as less as possible because it is possible to allow communication to be performed only among wearable wireless communication devices in a communication group set by a division function using a code combination.

Also, a wearable wireless communication device may greatly reduce power consumption in a reception-standby state by repeating one period including a sleep mode and an auto polling mode in the reception-standby state.

Also, a user may automatically send out a voice signal input to a receiver through an RF transceiver and an antenna of a wearable wireless communication device even without additional operation for inputting a voice through a PTT button and the like.

Also, a wearable wireless communication device that is easily worn due to an ergonomically designed case applied thereto and allows a user to feel comfortable without inconvenience even for a long time use.

Also, a wearable wireless communication device that may remotely control transmission of another wearable wireless communication device and may form a master-slave relationship between a plurality of wearable wireless communication devices to more efficiently perform voice communication between the wearable wireless communication devices between which the master-slave relationship is formed as described above.

Also, a wearable wireless communication device that may set a communication group with other wireless communication devices within a limited range by converting and sending out communication group setting information into a DTMF signal or by transmitting communication group setting information including a certain RSSI reference value and a wireless communication setting method using the method.

While the exemplary embodiments of the present invention have been described above, it should be understood by one of ordinary skill in the art that the present invention may be modified without departing from the essential features of the present invention. Therefore, the disclosed embodiments should be considered not in a limitative point of view but in a descriptive point of view. It should be understood that the scope of the present invention is defined by the claims not by the above description and includes all differences within the equivalent scope thereof.

What is claimed is:

1. A wearable wireless communication device comprising:
   a receiver to which a first analog voice signal is input;
   a first amplifier configured to amplify the first analog voice signal input through the receiver;
   a comparator configured to distinguish whether voice data is present in the amplified first analog voice signal output from the first amplifier and to output a signal in response to the voice data being present;
   an analog/digital (A/D) converter configured to convert the amplified first analog voice signal output from the first amplifier into a first digital voice signal;
   a controller connected in parallel to the comparator and the A/D converter, and configured to receive and output the first digital voice signal from the A/D converter in response to receiving the signal from the comparator and to output a second digital voice signal received through an antenna;
   a radio frequency (RF) transceiver configured to control an input of signals received at the controller through the antenna and transmission of signals output from the controller through the antenna;
   a digital/analog (D/A) converter configured to convert the second digital voice signal output from the controller into a second analog voice signal;
   a second amplifier configured to amplify the second analog voice signal output from the D/A converter; and
   a voice output portion configured to transmit the second analog voice signal output from the second amplifier,
   wherein the controller is further configured to transmit communication group setting information to other wireless communication devices within a limited range to set a communication group with the other wireless communication devices.

2. The wearable wireless communication device of claim 1, wherein the controller converts the communication group setting information into a dual tone multi-frequency (DTMF) signal and sends out the DTMF signal through the voice output portion, and
   wherein when the DTMF signal is input through the receiver, the controller obtains the communication group setting information by decoding the input DTMF signal.

3. The wearable wireless communication device of claim 2, wherein the DTMF signal has a frequency component of a 4×4 matrix.

4. The wearable wireless communication device of claim 1, wherein the controller transmits the communication group setting information including a certain received signal strength indicator (RSSI) reference value through the antenna, and
   wherein the controller extracts the RSSI reference value from the received communication group setting information when the communication group setting information is received through the antenna and checks the received communication group setting information when a measured RSSI value is the extracted RSSI reference value or more.

5. The wearable wireless communication device of claim 4, wherein the communication group setting information comprises a control instruction (INST) packet, and the RSSI reference value is included in a Reserve1 or Reserve2 area of the control INST packet.

6. The wearable wireless communication device of claim 1, wherein the communication group setting information comprises an ID, a paring code, a master, a slave, and a control INST of a wireless communication device to be included in the communication group.

7. The wearable wireless communication device of claim 1, wherein the controller amplifies a signal received through the antenna and transmits the signal through the antenna to allow the wearable wireless communication device to operate as a repeater or relay function.

8. The wearable wireless communication device of claim 1, wherein the controller transmits a signal received from another wireless communication device to a VoIP apparatus and transmits a signal received from the VoIP apparatus to the other wireless communication device to allow the wearable wireless communication device to operate a donor radio.

9. A communication group setting method using a wearable wireless communication device, the method comprising:
- determining, by a controller of the wearable wireless communication device, communication group setting information comprising an ID, a paring code that functions as a password, and a control instruction of a wireless communication device to be included in a communication group;
- transmitting, by the controller of the wearable wireless communication device intended to set the communication group, the communication group setting information to other wireless communication devices in a limited range to allow the wearable wireless communication device to set the communication group with the other wireless communication devices; and
- setting, by the controller, the communication group by allowing the other wireless communication devices to receive and check the communication group setting information,
- wherein the controller is connected in parallel to an analog/digital (A/D) converter and a comparator configured to output a signal in response to voice data being present in an amplified analog voice signal received from a first amplifier, and the controller is configured to output a first digital voice signal received from the A/D converter in response to receiving the signal from the comparator and to output a second digital voice signal received through an antenna.

10. The method of claim 9, wherein the transmitting of the communication group setting information comprises:
- converting the communication group setting information into a DTMF signal; and
- sending out the DTMF signal through a speaker, and
- wherein the setting of the communication group comprises:
- receiving the DTMF signal through a microphone; and
- obtaining the communication group setting information by decoding the DTMF signal.

11. The method of claim 9, wherein the transmitting of the communication group setting information comprises transmitting the communication group setting information including a certain RSSI reference value through an antenna, and
- wherein the setting of the communication group comprises:
- receiving the communication group setting information through the antenna and extracting the RSSI reference value from the received communication group setting information; and
- checking the received communication group setting information when a measured RSSI value is the extracted RSSI reference value or more.

* * * * *